United States Patent
Shigemori et al.

(10) Patent No.: US 6,784,215 B2
(45) Date of Patent: Aug. 31, 2004

(54) PRODUCTION PROCESS OF NON-FLYING PLASTIC MIRCOBALLOONS

(75) Inventors: Yoshihiro Shigemori, Tokyo (JP); Osamu Saito, Tokyo (JP); Yoshihiro Usui, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 59 days.

(21) Appl. No.: 09/988,145

(22) Filed: Nov. 19, 2001

(65) Prior Publication Data

US 2002/0096794 A1 Jul. 25, 2002

(30) Foreign Application Priority Data

Nov. 20, 2000 (JP) ........................................ 2000-353396

(51) Int. Cl.[7] .................................................. C08J 9/16
(52) U.S. Cl. .............................. 521/56; 264/51; 264/53
(58) Field of Search ....................... 264/53, 51, DIG. 6; 521/56, 57

(56) References Cited

U.S. PATENT DOCUMENTS

| | | | |
|---|---|---|---|
| 4,397,799 A | * 8/1983 | Edgren et al. | 264/53 |
| 4,513,106 A | 4/1985 | Edgren et al. | |
| 4,902,722 A | * 2/1990 | Melber | 521/54 |
| 5,753,156 A | 5/1998 | Shigemori et al. | |
| 6,459,878 B1 | * 10/2002 | Tomoyuki et al. | 399/331 |

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

Non-flying plastic microballoons are produced by bringing unexpanded, expandable plastic microballoons, which have been heated to a temperature lower than an expansion starting temperature thereof, and a mixture of a wetting agent and gas, the mixture having been heated to a temperature at least equal to the expansion starting temperature of the expandable plastic microballoons, into contact with each other to cause expansion of the expandable plastic balloons, and then cooling the resulting expanded plastic balloons.

5 Claims, 1 Drawing Sheet

PRODUCTION PROCESS OF NON-FLYING PLASTIC MIRCOBALLOONS

BACKGROUND OF THE INVENTION a) Field of the Invention

This invention relates to a process for producing plastic microballoons (hereinafter simply called "microballoons") which are prevented from flying and are used as a filler in various paints, construction materials, plastics and the like to reduce their weights. Described more specifically, expanded microballoons are generally used after applying non-flying treatment because they are light, have pronounced flying tendency and are hence difficult to handle. Nonetheless, they are still accompanied by various problems, and their handling properties and the like are by no means satisfactory. The present invention is concerned with a process for producing non-flying microballoons with good handling properties.

b) Description of the Related Art

Microballoons are generally packed in containers such as plastic bags or container sacks. When microballoons are taken out of such a container for addition to a base material such as a paint, they fly up in air as they are very light in weight. Upon mixing them with stirring, they rise to the surface of the base material so that a considerable time is required until they are evenly added and mixed in the base material. Microballoons are, therefore, a material the handling of which is extremely difficult.

To overcome these problems, proposals have been made including, for example, a process featuring addition of a wetting agent to microballoons (JP 4-71664 A) and a process characterized by causing an inorganic filler to deposit on surface skins or shells of microballoons. The former process is to impart non-flying property to microballoons by a wetting agent such as a plasticizer, while the latter process is to make microballoons non-flying by fixing an inorganic filler or the like on surface skins or shells of expandable microballoons (which are unexpanded and are filled with an expanding agent) and then causing the unexpanded microballoons. The microballoons with the inorganic filler fixed on the surface skins or shells involve drawbacks such that they are lowered in collapse strength and the non-flying property is imparted at the cost of their performance as a material intended to achieve a weight reduction.

A further approach has also been proposed including, for example, the processes disclosed in JP 4-178442 A and JP 7-196813 A. Each of these processes features expansion of expandable microballoons in a wetting agent. According to the former process, a slurry with expandable microballoons dispersed in a plasticizer is heated to have the expandable microballoons expanded, and subsequent to cooling the expanded microballoons with a fresh supply of the plasticizer as needed, an excess portion of the plasticizer is removed to obtain wet microballoons. According to the latter process, on the other hand, a slurry—which is composed of expandable microballoons and a plasticizer and has been heated to a temperature close to a temperature at which the expandable microballoons start expansion—and a wetting agent (free of expandable microballoons)—which has been heated to the expansion starting temperature of the expandable microballoons—are mixed to have the expandable microballoons instantaneously expanded, and the thus-expanded microballoons are cooled to obtain wet microballoons.

These conventional processes will be described in further detail. The process disclosed in JP 4-178442 A comprises dispersing, in the form of a slurry, expandable microballoons in a wetting agent, heating the slurry until expansion to have the expandable microballoons expanded, adding a plasticizer for cooling purpose, and finally removing an excess portion of the plasticizer to obtain wet microballoons.

A problem associated with the above-described process is that, because the thermal conductivity of those expanded earlier among expandable microballoons upon expansion under heat becomes extremely low, the heating of the expandable microballoons is prevented to result in a state in which expandable microballoons in an unexpanded form and over-expanded microballoons exist in a mixed state, thereby making it difficult to obtain uniform microballoons. There is another problems in that in the cooling step, the efficiency of heat removal is too low to achieve uniform cooling.

Non-flying microballoons are obtained through the removing step of a wetting agent. As the microballoons have a large surface area and the wetting agent is viscous, it is very difficult to efficiently remove the wetting agent to a target level. Even after the removal of the wetting agent, an excess wetting agent, therefore, remains on the surfaces of the microballoons. This leads to a significant handling problem such that the microballoons have pronounced stickiness and tend to form agglomerates.

On the other hand, the process disclosed in JP 7-196813 A comprises preheating a slurry, in which expandable microballoons are dispersed in a wetting agent, until immediately before expansion; bringing the thus-preheated slurry and a wetting agent, which as a heat source needed for expansion, has been heated to a temperature higher than an expansion temperature, into contact with each other to instantaneously complete the expansion; and then immediately cooling the thus-expanded microballoons in air to obtain microballoons in a form prevented from flying.

This process does not include any factor or cause for the impairment of heat conduction, which is one of the drawbacks of the former process, and therefore, can avoid localized over-heating. Moreover, owing to the use of a wetting agent in a small proportion, cooling is facilitated. It is, therefore, possible to avoid abnormal expansion of expandable balloons and collapse of microballoons, which would otherwise occur due to bursting. Further, occurrence of fusion agglomeration of microballoons themselves can be lessened. However, it is the problems of this process that, because the resin shells forming the expandable microballoons may undergo swelling during the preheating in the wetting agent, a limitation is imposed on the combination of the wetting agent and the resin making up the shells of the expandable microballoons and the preheating has to be conducted at a temperature lower than the expansion starting temperature to avoid the swelling of the resin shells.

As the preheating temperature is lowered, it is necessary either to raise the temperature of the wetting agent as the heat source or to increase the amount of the wetting agent to be used. Because of a deterioration of the wetting agent by heat or safety consideration in the former process and because of the need for the use of the wetting agent in a large amount in the latter process, the wetting agent is obviously used in an amount greater than that needed for effectively preventing flying of microballoons. As a consequence, the microballoons have strong stickiness and tend to form agglomerates, thereby developing inconvenience or a problem in handling.

To form commercially-available, expandable microballoons into a high-flowability slurry in a wetting agent, the wetting agent is usually employed in a proportion 1.5 to 3 times as much as the weight of the expandable microballoons. To this dispersed slurry, a heating, wetting agent as a heat source for having the expandable microballoons expanded is added in substantially the same weight to have the expandable microballoons expanded, so that non-flying microballoons are obtained. As the wetting agent as the expanding heat source has to concurrently heat the wetting agent which forms the dispersed slurry, the wetting agent as the expanding heat source must be added in an amount sufficient to provide heat in a quantity many times over that basically required only for the expansion of the expandable microballoons. Therefore, the wetting agent as the heat source is used in a weight proportion at least 3 times, generally about 5 times as much as the expandable microballoons.

This means that the wetting agent is used in an amount greater than that needed for the prevention of flying of microballoons. The resulting microballoons, therefore, have strong stickiness, thereby developing inconvenience or a problem in handling. Further, the excess use of the wetting agent also develops inconvenience in the cooling step. Described specifically, the resin which makes up the shells of the microballoons is in a softened state after the expansion. The shells themselves, therefore, undergo fusion agglomeration so that large agglomerates are formed. When added to a paint or the like, these agglomerates develop inconvenience such that they rise to the surface. Upon using the paint, it is thus necessary to remove such agglomerates beforehand. Even if removal of such agglomerates is attempted, the screening efficiency is poor due to the stickiness, leading to a problem in that such removal can hardly be achieved industrially.

SUMMARY OF THE INVENTION

An object of the present invention is to provide a process for the production of non-flying microballoons, which are free of problems in production such as those described above, difficulties in automated metering and packing work caused by the excessive stickiness of microballoons prevented from flying with a wetting agent, and other problems such as problems in handling upon use, for example, in charging work of expanded microballoons, deposition on the apparatus used, troubles in a metering device, and fouling or contamination of the used apparatus and the production environment.

To achieve the above-described object, the present inventors have proceeded with extensive research. As a result, it has been found that the object of the present invention can be achieved by preheating only expandable microballoons and using, as an expanding heat source for the expandable microballoons, a heated mixture of a wetting agent and gas, leading to the completion of the present invention.

The above-described object of the present invention can be achieved by the present invention as will be described hereinafter. Described specifically, the present invention provides a process for the production of non-flying plastic microballoons, which comprises bringing unexpanded, expandable plastic microballoons, which have been heated to a temperature lower than an expansion starting temperature thereof, and a mixture of a wetting agent and gas, said mixture having been heated to a temperature at least equal to the expansion starting temperature of the expandable plastic microballoons, into contact with each other to cause expansion of the expandable plastic balloons, and then cooling the resulting expanded plastic balloons.

It is the function of the wetting agent to make the microballoons loosely agglomerate by means of the stickiness of the wetting agent such that the microballoons are rendered non-flying. The amount of the wetting agent required to impart non-flying property does not substantially differ in terms of weight ratio to microballoons irrespective of the expansion ratio of the microballoons, because microballoons of a high expansion ratio have a large surface area and are light in weight while microballoons of a low expansion ratio have a small surface area and are heavy in weight. The kind of the wetting agent, in other words, the degree of its stickiness, therefore, has a great effect on the amount of the wetting agent to be used. To 100 parts by weight of microballoons having, for example, a true specific gravity of 0.02 and a mean particle size of 130 micrometers or so, a wetting agent, for example, DINP (plasticizer: diisononyl phthalate) can impart sufficient non-flying property to the microballoons when employed in a proportion of from about 20 to 100 parts by weight. In general, the upper limit of the wetting agent is desirably 300 parts by weight or less.

The process of the present invention can, therefore, impart non-flying property to microballoons by using a wetting agent in a amount substantially smaller than the conventional processes, and can solve the problems of the conventional processes in handling. When microballoons produced by the conventional processes are added to paints, inks, sealants and the like, the microballoons give influence to the physical properties of the paints, inks, sealants and the like due to the inclusion of a wetting agent in a large proportion. The process of the present invention also makes it possible to reduce such influence.

The present invention can reduce the amount of a wetting agent, and can provide non-flying microballoons improved also in handling properties. The microballoons obtained by the process of the present invention has a merit in that no limitation is imposed on their application owing to the inclusion of the wetting agent in a smaller proportion. Described specifically, the wetting agent adhered on the non-flying microballoons, in many instances, is not always identical in composition to a plasticizer or the like in a material in which the microballoons are used as a weight-reducing material. In the case of conventional non-flying microballoons which contains a wetting agent in a large proportion, a limitation is imposed on their application, or it becomes necessary to design non-flying microballoons with the kind of a wetting agent varied depending upon their application. These limitations are troublesome both technically and industrially in many instances, and the production process of the present invention, which does not develop such problems, has a significant industrial merit in that the amount of a wetting agent can be reduced.

DETAILED DESCRIPTION OF THE INVENTION AND PREFERRED EMBODIMENTS

Figure 1:
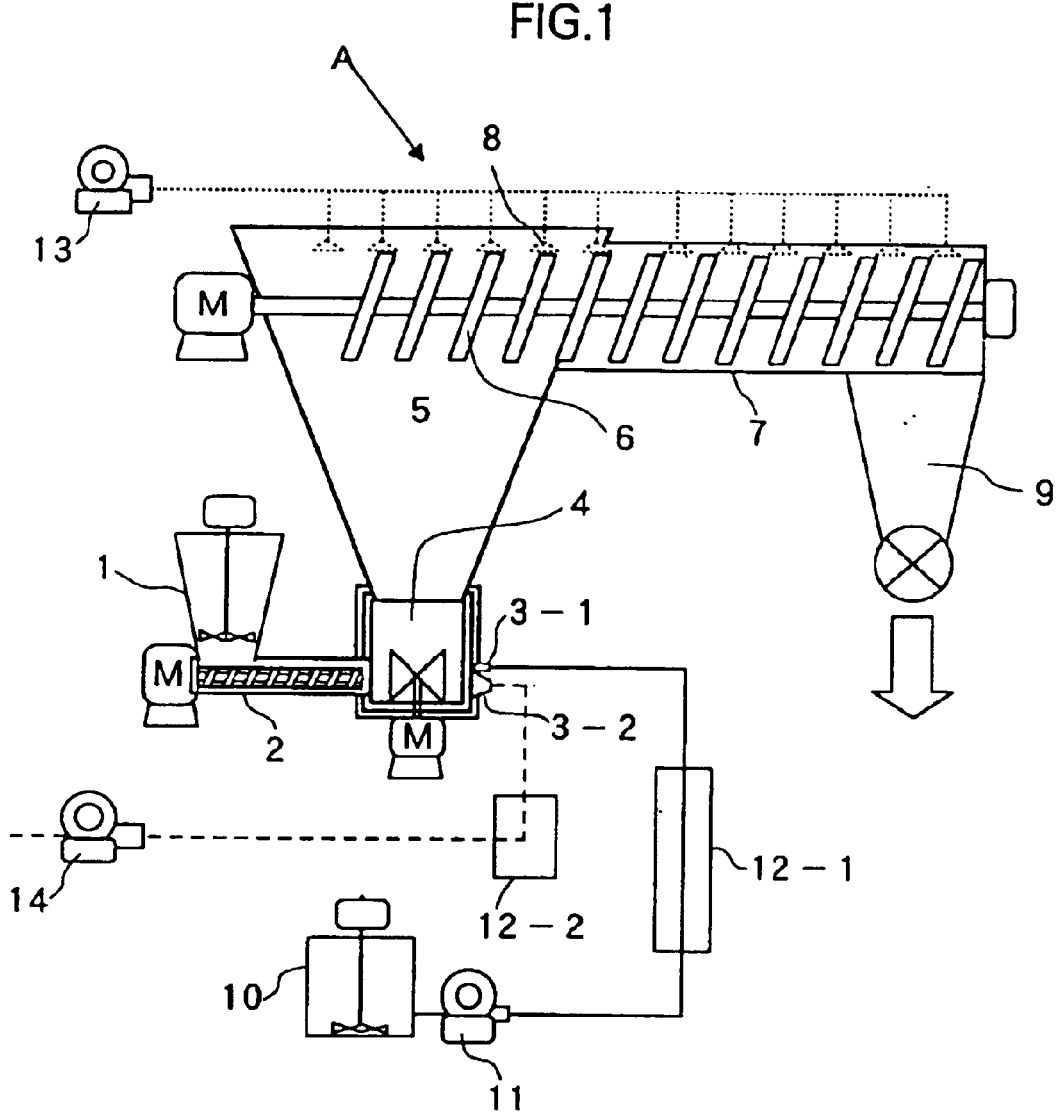
FIG. 1 is a schematic diagram showing one example of a production line for use in the present invention.

The present invention will hereinafter be described in further detail. One of the characteristic features of the production process according to the present invention is to heat only the expandable microballoons, which are free of the wetting agent, beforehand to a temperature shortly before their expansion starts. Described specifically, the expandable microballoons are preheated without addition of the wetting agent, the resin (plastics) which makes up the shells of the expandable microballoons does not undergo swelling, so that the expandable microballoons can be heated until shortly before their expansion starting temperature. The amount of the wetting agent to be used as the heat source for expansion can be decreased as the preheating temperature becomes closer to the expansion starting temperature. As a result, the production of non-flying microballoons of good handling properties, which is the object of the present invention, has become feasible.

In the present invention, it is important to achieve instantaneous contact between the preheated expandable microballoons and the preheated mixture of the wetting agent and the gas as a heat source for the expansion of the expandable microballoons. To this end, it is necessary to feed the expandable microballoons, which have been preheated to the above-described temperature, and the mixture of the wetting agent and the gas, which have also been preheated to the above-described temperature, into a mixer and then to stir them at a high speed such that they are instantaneously brought into contact with each other. Here, it is particularly important to complete their mixing into a homogeneous mixture at a time point earlier than the initiation of expansion.

Subsequent to the initiation of expansion, gas is fed desirably upon an elapse of an aging period of from 10 seconds to 30 seconds or so. While breaking up agglomerates, this gas can form voids between particles of microballoons to cool the microballoons with the gas, so that the target non-flying microballoons can be obtained. Although it is preferred to also preheat the gas to be mixed with the preheated wetting agent, this preheating is not absolutely needed, for example, insofar as the amount of the gas is not large and, when gas is mixed with the wetting agent heated to a temperature equal to or higher than the expansion starting temperature, the wetting agent retains this temperature.

The combined use of the wetting agent and the gas is important for enhancing the stirring effect of a mixer in a production line for use in the present invention such that the powdery particles of expandable microballoons are prevented from forming balls by their contact with the wetting agent and/or from depositing on a blade and walls of the mixer and staying there. Especially when a wetting agent having high viscosity is used, the feeding of gas is more important for obtaining uniform microballoons. Accordingly, the use of the preheated mixture of the wetting agent and gas as a heat source for expansion is a second-feature of the present invention.

The mixing ratio (volume) of the expandable microballoons and the gas can be hardly set in a whole sale manner, because it is determined by the particle size of the target non-flying microballoons, the added amount of the wetting agent and the structure of the mixer. It is, therefore, desired to determine their appropriate mixing ratio at the production line. For example, a volume ratio of from 1 to 200 parts, preferably from about 10 to 200 or so of gas to 100 parts of expandable microballoons, which can be expanded 50-fold in volume, can give good results and therefore, is preferred.

To add the gas into a mixing tank in a production line for use in the present invention, a small-diameter nozzle is arranged at a location apart from a feed nozzle for the wetting agent. Instead of such a single nozzle, two or more small-diameter nozzles may be arranged at different locations which are apart from the feed nozzle. As a further alternative, such one or more small-diameter nozzles may be arranged in the vicinity of a free end portion of the feed nozzle for the wetting agent. Use of heated gas as a heat source makes it possible to reduce the amount of the wetting agent further. From the safety standpoint, it is effective to use, as the gas, an inert gas such as nitrogen gas.

A description will next be made about the materials for use in the present invention. The expandable microballoons usable in the production process of this invention are microcapsules, which have shells of a thermoplastic resin (for example, a homopolymer or copolymer of vinylidene chloride, methacrylonitrile, an acrylate, a methacrylate, styrene or the like) and are filled with a low boiling-point hydrocarbon (for example, butane, pentane, hexane or the like) as an expanding agent. Such expandable microballoons are known to the public, and are employed extensively these days for the production of microballoons.

They are sold on the market, for example, under trade names such as "Matsumoto Microspheres" (product of Matsumoto Yushi-Seiyaku Co., Ltd.) and "Marcelites" (product of Miyoshi Oil & Fat Co., Ltd., and are readily available. In the present invention, they can be used as are. These commercial microcapsules are generally about 1 to 50 $\mu$m in diameter, and microballoons available from their expansion are spherical particles which are of about 20 to 300 $\mu$m in diameter and resemble practically true spheres. Although the expanding temperature differs depending upon the kinds of the filled low boiling-point hydrocarbon and thermoplastic resin, microcapsules which expand at about 100 to 170° C. are generally employed in many instances.

The wetting agent used in the present invention is primarily an organic liquid compound. When the microballoons are used in paints, sealants, building or construction materials, plastics or the like, plasticizers added in such base materials can be used as wetting agents. Illustrative are plasticizers of the phthalate ester type, such as di-2-ethylhexyl phthalate (DOP), diisodecyl phthalate (DIDP), diisononyl phthalate (DINP), ditridecyl phthalate (DTDP) and butyl phthalylbutyl glycolate (BPBG); plasticizers of the aliphatic dibasic acid ester type, such as di-2-ethylhexyl adipate (DOA), diisodecyl adipate (DIDA) and di-2-ethylhexyl sebacate (DOS); epoxy plasticizers such as epoxylated soybean oil (ESBO); plasticizers of the phosphate ester type, such as trecresyl phosphate; and other ester-base plasticizers, and plasticizers of the fatty acid ester type. Further, organic liquid compounds which have been increasingly finding utility for the recent concern about the environment, for example, plasticizers of the citrate ester type such as acetyltributyl citrate (ATBC) and triethyl citrate (TEC), phenyl alkylsulfonate and vegetable oil can also be used likewise.

Depending upon the application purpose of microballoons in light-weight expansion-molded products, adhesives, aqueous chemical products such as water-base paints, and others, additives other than plasticizers are also usable including, for example, liquid paraffin, silicone oil, oils and fats, water-soluble polyhydric alcohols, such as ethylene glycol, and their derivatives, and surfactants such as polyoxyethylene nonyl phenyl ether, sorbitan monostearate and alkylbenzene sulfonate. Further, illustrative of water-soluble wetting agents are polyethylene glycols.

Together with the above-described wetting agent, additives employed in the relevant field of technology can also be used as needed. Examples of such additives can include organic and inorganic fillers, stabilizers, antistatic agents, flame retardants, and colorants. In the present invention, it is especially effective to use two or more wetting agents of different viscosities in combination and to use organic substances soluble in the wetting agents, such as surfactants, dispersants, solvents and resins. It is also effective to add an inorganic filler to the heating wetting agent as a heat source for expansion and to use the heating wetting agent with increased heat capacity.

The production process of the present invention will hereinafter be described based on the illustrative production line shown in FIG. 1. The production line A is constructed of a stirrer-equipped feed hopper 1 having a heating jacket and adapted to heat and stir expandable microballoons; a constant delivery feeder 2 for expandable microballoons, which has a heating jacket to heat the expandable microballoons to a desired temperature; a spray unit provided with a wetting agent feed nozzle 3-1 and a gas feed nozzle 3-2; a mixing and expanding tank 4 provided with a mixing and stirring blade for mixing the expandable microballoons and wetting agent, which have been heated to desired temperatures, by controlling rotation of the stirring blade; a screw conveyor 6 for feeding microballoons, which have been formed by expansion, to a cooling conveyor trough 7 arranged in an upper part 5 of the mixing and expanding tank 4, and cooling gas feed nozzles 8 arranged in the cooling conveyor trough 7; a storage tank 9 for non-flying microballoons as a final product; a wetting agent tank 10 having a stirrer and structured such that the wetting agent can be preheated; a constant delivery pump 11 for supplying the wetting agent at a constant rate to the wetting agent feed nozzle 3-1; a heat exchanger 12-1 for further heating to a desired temperature the wetting agent fed from the wetting agent tank 10; a compressor 14 for feeding gas to the gas feed nozzle 3-2 subsequent to heating the gas at a heat exchanger 12-2; and a compressor 13 for feeding the gas to the cooling gas feed nozzles 8. The ratio of the preheated wetting agent to the preheated gas, which are supplied from the feed nozzles 3-1 and 3-2 to the mixing and expanding tank 4, respectively, can be adjusted to a desired ratio by the constant delivery pump 11 and the compressor 14.

The spray unit is constructed of the wetting agent supply nozzle 3-1 and the gas feed nozzle 3-2, both of which are arranged on the mixing and expanding tank 4. The gas feed nozzle 3-2 may be arranged at a location apart from the wetting agent supply nozzle 3-1, or may be arranged in the vicinity of a free end portion of the wetting agent supply nozzle 3-1. Instead of such a single gas supply nozzle, two or more gas supply nozzles may be arranged at different locations which are apart from the wetting agent feed nozzle 3-1.

The mixing and expanding tank 4 is provided with a high-speed mixer having a stirring blade. The high-speed mixer can instantaneously mix the preheated expandable microballoons, which have been fed from the constant delivery feeder 2, and the preheated wetting agent and gas, which have been supplied from the feed nozzles 3-1 and 3-2, respectively, into a homogeneous mixture, and can instantaneously cause the expandable microballoons to expand.

The non-flying microballoons formed in the mixing and expanding tank 4 are lifted and conveyed to the screw conveyor 6 arranged in the upper part of the tank, and are then fed to the cooling conveyor trough 7. By the gas from the cooling gas feed nozzles 8 arranged on peripheral walls of the screw conveyor 6 and cooling conveyor trough 7, the non-flying microballoons are cooled, are stored in the storage tank 9, and are shipped in sacks or the like.

It is to be noted that FIG. 1 illustrates the basic construction of the production line and that the heating method, mixing method, conveying method and cooling method are not limited to the exemplified methods and may be replaced by other methods. For example, the feeding of the wetting agent can be effectively performed by feeding it through a small-diameter nozzle with a pump, by spraying it under pulses from an airless gun, or by feeding it through a pulsated metering machine. These methods are effective especially for a wetting agent having high viscosity. Use of a conventional spray results in insufficient mixing due to the existence of the gas in a large volume. Especially in the case of a wetting agent of high viscosity, the resulting mixture becomes non-homogeneous so that no good results are available.

The present invention will hereinafter be specifically described based on Examples and a Comparative Example. In each of the Examples and Comparative Example, the production line illustrated in FIG. 1 was used. Concerning the term "expansion starting temperature of expandable microballoons" as used in the present invention, the state of expansion of expandable microballoons was observed under a microscope fitted with a heater (manufactured by Lincam Ltd.) while heating the expandable microballoons at a ramp-up rate of 20° C./min, and the temperature at which 10% of the particles of expandable microballoons within a field of view had expanded was recorded as an expansion starting temperature.

EXAMPLE 1

Expandable microballoons ("MarceliteH750D", trade name; product of Miyoshi Oil & Fat Co., Ltd.; expansion starting temperature: 155° C.) were fed into the mixing and expanding tank 4 at a rate of 50 kg/hr by the constant delivery feeder 2 via the feed hopper 1 the temperature of which was set to heat the expandable microballoons to 130° C. On the other hand, DINP as a wetting agent, which had been preheated to 100° C., was fed into the mixing and expanding tank 4 at a rate of 50 kg/hr by the constant delivery pump 11 through the nozzle 3-1 subsequent to its heating to 180° C. at the heat exchanger 12-1. By the compressor 14, gas was also fed at a rate of 50 L/hr from the nozzle 3-2 into the mixing and expanding tank 4 subsequent to its heating to 180° C. at the heat exchanger 12-2.

The heated expandable microballoons, the heated wetting agent and the heated gas were brought into contact with each other while being stirred by the high-speed mixer arranged in the mixing and expanding tank 4 and provided with the stirring blade the rotational speed of which was set at 3,000 rpm. The expandable microballoons were caused to expand, lifted to the upper part 5 of the mixing and stirring tank 4, and conveyed into the cooling conveyor trough 7 by the screw of the screw conveyor 6. During the conveyance, the expanded microballoons were cooled to about 60° C. with cooling air, and non-flying microballoons were drawn as a final product at a rate of 100 kg/hr from an outlet of the storage tank 6.

The thus-obtained microballoons were evenly wet at the surfaces thereof with the wetting agent, had adequate stickiness to each other, had no flying property, and were good in handling properties. To determine the extent of fusion agglomeration of microballoons, 10 g of the microballoons were sampled and examined. The largest agglomerate diameter was about 300 μm, and the agglomeration of fused microballoons themselves was of such an extent that the agglomeration was broken up by weak shear force. When added to a paint or the like and stirred, the agglomeration was readily broken up, thereby permitting even dispersion of the microballoons. Further, the residue on a 60-mesh sieve was in an extremely small amount of trace level. Physical properties (true specific gravity, bulk density and dispersibility), properties (residue on sieve, and the break-up readiness and color of agglomerated particles) and handling properties (non-flying property and stickiness) of the thus-obtained microballoons were ranged. The results are presented in Table 1. The following ranking methods were used.

[Dispersibility]

Mix a vinyl chloride resin paint (100 parts) with a sample (0.5 part in terms of pure microballoons). Coat the resulting mixture to a thickness of 1 mm on a base material having a smooth surface, and dry. Bake the thus-dried coating at 140° C. for 20 minutes. The dispersibility is ranked "A" when it is comparable or better compared with the dispersibility of a standard product (a sample prepared by the process disclosed in JP 7-196813 A), and "B" when it is inferior to the dispersibility of the standard product.

[Condition and Break-up Readiness of Agglomerated Particles]

Collect a sample (0.5 g in terms of pure microballoons) Measure ethyl acetate (200 g), and stir and mix the sample and ethyl acetate at 300 rpm for 1 minute in a dissolver. Screen the resulting mixture three times through a sieve the opening of which is 250 μm. The break-up readiness is ranked "A" when no agglomerates are contained, and "B" when agglomerates are contained.

[Non-flying Property]

Collect a sample (0.5 g in terms of pure microballoons), and drop it from a height of 30 cm in a calm. The non-flying property is ranked "A" when no flying microballoons are observed 5 seconds later, and "B" when microballoons are flying 5 seconds later.

[Stickiness]

Weight a sample (0.5 g in terms of pure microballoons) in a polyethylene-made plastic bag, and shake the sample for 1 minute. After emptying the sample, compare the amount of particles adhered on the plastic bag with the corresponding amount of the above-described standard product. The stickiness is ranked "A" when the adhered amount is smaller than that of the standard product, "B" when the adhered amount is comparable with that of the standard product, and "C" when the adhered amount is greater than that of the standard product.

EXAMPLE 2

Wet microballoons were obtained and ranked as in Example 1 except that the feed rate of the wetting agent was changed to 25 kg/hr, the heated temperature at the heat exchanger 12-1 was changed to 230° C., air was changed to nitrogen, and the heating at the heat exchanger 12-2 was changed to 250° C. The results of the ranking are presented in Table 1.

EXAMPLE 3

Wet microballoons were obtained and ranked as in Example 1 except that the feed rate of the wetting agent was changed to 150 kg/hr, the heated temperature at the heat exchanger 12-1 was changed to 170° C., air of room temperature was used, and the feed rate of the air was changed to 10 L/hr. The results of the ranking are presented in Table 1.

EXAMPLE 4

In the wetting agent, calcium carbonate was dispersed in a proportion of 100 parts by weight per 100 parts by weight of the wetting agent to form the calcium carbonate into a slurry. Filler-added wet microballoons were obtained under the same conditions as in Example 1 except that the thus-mixed wetting agent was heated to 180° C. at the heat exchanger 12-1 and its feed rate was changed to 40 kg/hr. The filler-added wet microballoons had a composition containing the wetting agent and filler in proportions of 40 parts by weight and 40 parts by weight per 100 parts by weight of the microballoons, had low stickiness, and were non-flying microballoons which were easy to handle. The results of the ranking are presented in Table 1.

EXAMPLE 5

Microballoons to which non-flying treatment was applied were obtained as in Example 1 except that "Marcelite H750D" was changed to "M430" (trade name; product of Miyoshi Oil & Fat Co., Ltd.; expansion starting temperature: 130° C.), the expandable microballoons were heated to 100° C., the wetting agent was heated to 160° C. at the heat exchanger 12-1, and air was heated to 160° C. at the heat exchanger 12-2, and were ranked. The results of the ranking are presented in Table 1.

EXAMPLE 6

Microballoons were obtained as in Example 1 except that the wetting agent was changed to a silicone oil ("KF-96", trade name; product of Shin-Etsu Chemical Co., Ltd.; viscosity: 1,000 cst), and were ranked. The results of the ranking are presented in Table 1.

COMPARATIVE EXAMPLE 1

Microballoons were obtained as in Example 1 except that the amount of heated air was changed to 0. This product was in a non-homogeneous form with unexpanded, expandable plastic microballoons and over-expanded, burst microballoons mixed in amounts greater that the corresponding amounts in Example 1. The results of ranking are presented in Table 1.

TABLE 1

| | | Physical property | | | Property | | | Handling property | |
|---|---|---|---|---|---|---|---|---|---|
| | | True specific gravity (g/cm³) | Bulk density (g/cm³) | Dispersibility | Residue on sieve (g/10 g) | Break-up readiness | Color | Non-flying property | Stickiness |
| Example | 1 | 0.039 | 0.011 | A | 0.001 | A | Pale yellow | A | B |
| | 2 | 0.030 | 0.088 | A | 0.001 | A | Pale yellow | A | A |

TABLE 1-continued

|   |   | Physical property | | | Property | | | Handling property | |
|---|---|---|---|---|---|---|---|---|---|
|   |   | True specific gravity (g/cm³) | Bulk density (g/cm³) | Dispersibility | Residue on sieve (g/10 g) | Break-up readiness | Color | Non-flying property | Stickiness |
|   | 3 | 0.075 | 0.021 | A | 0.001 | A | Pale yellow | A | B |
|   | 4 | 0.278 | 0.076 | A | 0.001 | A | Pale yellow | A | A |
|   | 5 | 0.039 | 0.011 | A | 0.001 | A | Pale yellow | A | B |
|   | 6 | 0.040 | 0.012 | A | 0.001 | A | Pale yellow | A | B |
| * | 1 | 0.075 | 0.022 | B | 0.4 | B | Mixed dark/pale yellow | A | B |

*Comparative Example

What is claimed is:

1. A process for the production of non-flying plastic microballoons, which comprises bringing unexpanded, expandable plastic microballoons, which have been heated to a temperature lower than an expansion starting temperature thereof, and a mixture of a wetting agent and gas, said mixture having been heated to a temperature at least equal to said expansion starting temperature of said expandable plastic microballoons, into contact with each other to cause expansion of said expandable plastic balloons, and then cooling the resulting expanded plastic balloons, wherein said wetting agent is an organic liquid having a boiling point higher than the temperature to which said mixture of said wetting agent and said gas is heated.

2. A process according to claim 1, wherein said expandable plastic microballoons are microcapsules of a thermoplastic resin filled with a low boiling-point hydrocarbon as an expanding agent.

3. A process according to claim 1, wherein said expandable plastic microballoons and said mixture of said wetting agent and said gas, both of said microballoons and said mixture having been preheated, are instantaneously brought into contact with each other.

4. A process according to claim 1, wherein said wetting agent is used in a proportion of from 20 to 300 parts by weight per 100 parts by weight of said unexpanded, expandable plastic microballoons.

5. A process according to claim 1, wherein, said unexpanded, expandable plastic microballoons and said gas are used at a volume ratio of from 100:1 to 100:200.

* * * * *